Feb. 19, 1935.  R. V. HEUSER  1,991,852
METHOD FOR MAKING THIOUREA
Filed Jan. 21, 1931
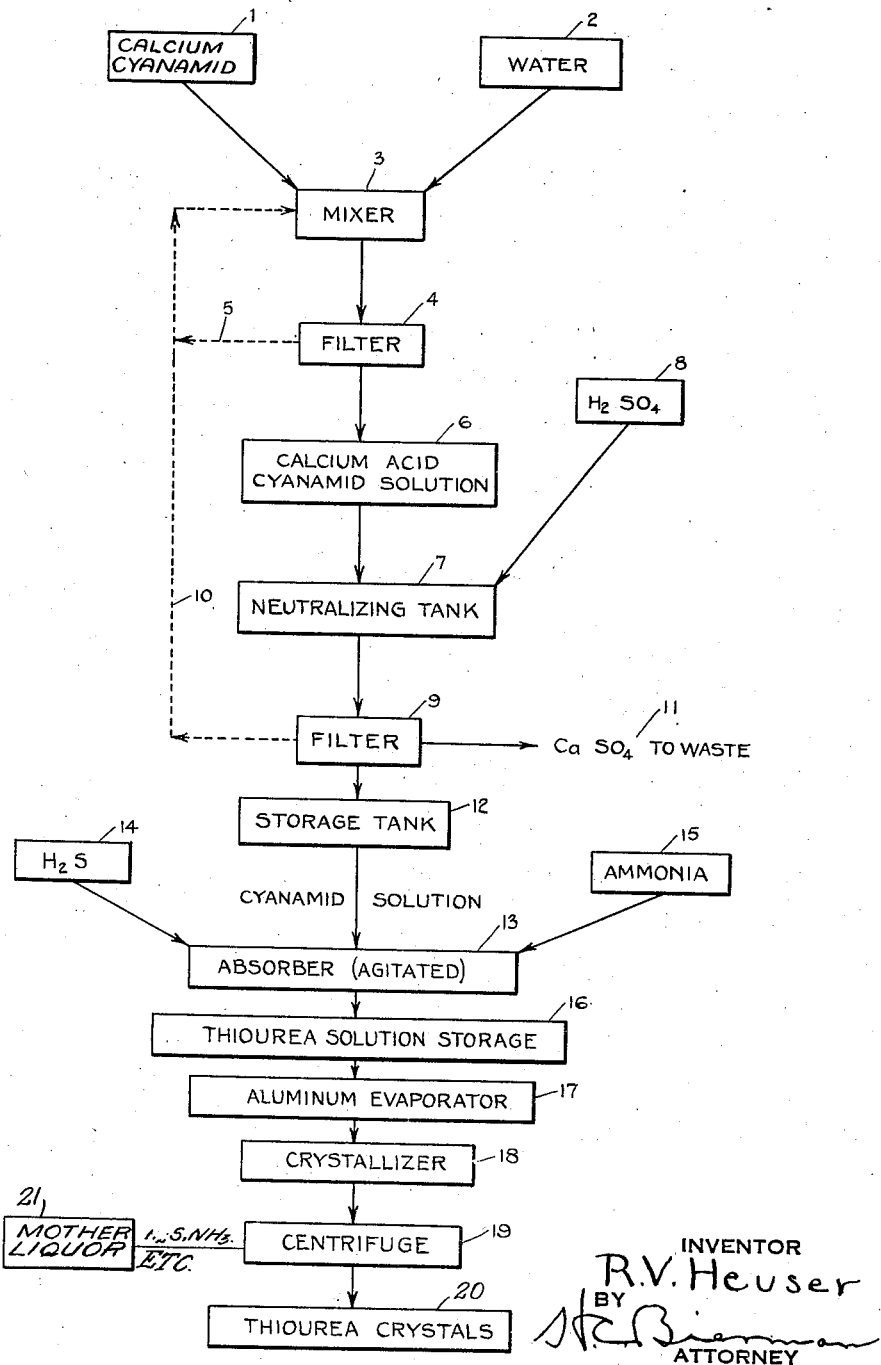

Patented Feb. 19, 1935

1,991,852

UNITED STATES PATENT OFFICE 1,991,852

METHOD FOR MAKING THIOUREA

Ralph V. Heuser, Cranford, N. J., assignor to American Cyanamid Company, New York, N. Y., a corporation of Maine Application January 21, 1931, Serial No. 510,081

6 Claims. (Cl. 260—125)

This invention relates to the production of thiourea from cyanamid and hydrogen sulfide.

There have been proposed from time to time various methods of manufacture of thiourea starting with cyanamid, but for various reasons such prior processes have not been successful. For example, it has been proposed to cause a reaction between free cyanamid and ammonium-poly-sulfide for the production of thiourea, and certain variations of this process have also been attempted. For instance, free cyanamid has been caused to react with ammonium sulfide in the presence of sulphur and it has also been caused to react with hydrogen sulfide in the presence of some ammonium sulfide.

The present invention is designed to provide a method of making thiourea from cheap raw materials, such as a cyanamid with a good efficiency in a comparatively pure condition.

In practicing my invention I dissolve calcium cyanamid in water, causing a precipitation of ½ of the combined calcium, in the form of calcium hydroxide. The latter as well as other impurities are separated by filtration from the solution of calcium acid cyanamid. The filtrate is then converted into a solution of free cyanamid. This is effected by causing the calcium acid cyanamid solution to react with a dilute sulphuric acid solution, under such conditions that the reaction liquor is always slightly acid to methyl red as the stability of a cyanamid solution approaches a maximum at the pH value 5.0. Furthermore, I take the precaution of keeping the temperature below 40° C. in all cases, and preferably below 30° C. Such a procedure minimizes the formation of dicyandiamid which is an undesirable impurity as it interferes with many uses of the thiourea. The slightly acid solution of free cyanamid is then subjected to vigorous treatment with hydrogen sulfide in the presence of ammonia or other hydroxides capable of forming soluble sulfides. The amount of ammonia which I prefer to use need not exceed one tenth of the amount required theoretically to produce ammonium hydrosulfide. The ammonia serves as a catalyst as it is regenerated in the conversion of the cyanamid to thiourea. Fresh hydrogen sulfide reacting with the ammonia liberated will convert the latter again to ammonium hydrosulfide.

Hydrogen sulfide is absorbed very rapidly by causing it to be brought into intimate contact with the solution either by vigorous mechanical stirring or by circulating it through a column in counter-current to the descending liquor. The solution remains always acid to phenol phthalein or in other words the pH is lower than 8.3 provided that the admission of hydrogen sulfide is sufficiently rapid. At the conclusion of the operation the liquor contains free hydrogen sulfide. With a view to minimize the formation of dicyandiamid and guanyl thiourea it is desirable to conduct the operation at a temperature not exceeding 50° C. at which temperature the reaction proceeds sufficiently rapidly. If a higher temperature is employed the reaction velocity is increased considerably and care must be taken that the supply of hydrogen sulfide is adequate so as to prevent the ammonia also from accelerating the polymerization of cyanamid to dicyandiamid.

The accompanying drawing, constituting a part hereof, is a flow sheet showing the various steps involved in the process. Calcium cyanamid from vessel 1 is mixed with water 2 in mixer 3 where the first step of the reaction takes place with the formation of calcium acid cyanamid which is filtered at 4 and the wash water 5 returned to the mixer 3. Calcium acid cyanamid solution 6 is placed in the neutralizer tank 7 to which there has first been added a small amount of sulfuric acid 8 and the addition of the calcium acid cyanamid solution and the sulfuric acid solution may be made simultaneous so as to maintain the mixture in the neutralizer tank at a pH value of approximately 5 until the operation is completed. The temperature of the mixture is kept preferably below 25° C. The slurry containing free cyanamid and calcium sulfate is filtered in filter 9, the wash water 10 therefrom being returned to the mixer 3. The difficultly soluble calcium sulfate 11 is washed and the filtrate is placed in a storage tank 12. From there the solution is run into absorber 13 which is provided with suitable agitating means or it is allowed to run over a packed tower in counter-current to the hydrogen sulfide. Hydrogen sulfide 14 is run into the absorber 13 to which the desired amount of ammonia 15 has been added. The acidity of the solution is maintained just acid to phenol phthalein and the temperature is maintained between 50° and 85° C. but may go as high as 90° C. When all cyanamid has been converted, the thiourea liquor is run into the storage tank 16 from which it goes to evaporator 17 where it is concentrated to the desired degree, about 15° B. The solution is clarified and then goes to crystallizer 18 and centrifugal 19 where the thiourea crystals 20 are removed from the mother liquor 21. Some of the ammonia may come off in the evaporator 17 but the bulk of the ammonia, probably in the form of ammonium sulfide, remains in the mother liquor 21. If desired the crystallizate may be purified by recrystallization.

From the above description of my invention it will be noted that the process is comparatively simple in execution and control.

Although I have described my invention setting forth certain temperatures and certain relative amounts of materials, it is obvious that my invention is not limited to the exact details described. Variations from the procedure and variations in the apparatus obviously are within the scope of my invention which is defined in the claims appended hereto.

What I claim is:

1. A method of making thiourea which comprises providing a solution of free cyanamid and ammonium hydrosulfide in an amount representing a minor fraction of that required theoretically to react with all of the free cyanamid, and introducing hydrogen sulfide into the solution at such a rate that it is maintained acid to phenolphathalein.

2. A method of making thiourea which comprises providing a solution of free cyanamid and ammonium hydrosulfide in an amount representing a minor fraction of that required theoretically to react with all of the free cyanamid, and introducing hydrogen sulfide into the solution at such a rate that the solution has an acid reaction corresponding to a value not in excess of pH 8.3.

3. A method of making thiourea which comprises providing a solution of free cyanamid, adding ammonia thereto, introducing hydrogen sulfide at such a rate that the solution has an acid reaction corresponding to a value not in excess of pH 8.3, the amount of ammonia used being about 5 to about 10% of the theoretical amount required to combine with the theoretical amount of hydrogen sulfide needed to react with all of the free cyanamid.

4. The method of claim 3 in which the solution is maintained at an elevated temperature not in excess of 90° C. during introduction of the hydrogen sulfide.

5. The method of claim 3 in which the solution is maintained at a temperature of about 50° C. during introduction of the hydrogen sulfide.

6. The method of claim 3 in which the introduction of the hydrogen sulfide is continued until substantially all of the cyanamid has been reacted.

RALPH V. HEUSER.